United States Patent Office 2,806,885
Patented Sept. 17, 1957

2,806,885

PREPARATION OF 3,4-3',4'-BISDEHYDRO-β-CAROTENE

Otto Isler, Basel, Herbert Lindlar, Reinach (Basel), Marc Montavon and Rudolf Rüegg, Basel, and Paul Zeller, Neuallschwil, Switzerland, assignors to Hoffmann-La Roche Inc., Nutley, N. J., a corporation of New Jersey No Drawing. Application December 15, 1955, Serial No. 553,211

Claims priority, application Switzerland December 24, 1954

3 Claims. (Cl. 260—617)

This invention relates to novel chemical syntheses, and to novel chemical compounds useful as intermediates therein. More comprehensively, the invention relates to a novel method of preparing all-trans-3,4-3',4'-bisdehydro-β-carotene. [In those nomenclatures employed in the instant disclosure wherein $C_{40}$-carotenoid compounds are named on the basis of carotene as a reference structure, the numbers are applied to the forty carbon atoms of the fundamental carotene carbon skeleton according to the numbering system shown in Liebigs Annalen der Chemie, volume 573, page 3 (1951), as a model.]

In one briefly described aspect, the invention provides a process of making all-trans-3,4-3',4'-bisdehydro-β-carotene which comprises condensing acetylene with 8-(2,6,6-trimethyl-1,3-cyclohexadien-1-yl) - 2,6 - dimethyl-2,4,6-octatrien-1-al by means of metal-organic reactions, either stepwise or in a single reaction, thereby producing the condensation product 1,18-di-(2,6,6-trimethyl-1,3-cyclohexadien-1-yl)-3,7,12,16-tetramethyl-8,11-dihydroxy-2,4,6,12,14,16-octadecahexaen-9-yne; subjecting said condensation product to bilateral allyl rearrangement-dehydration thereby producing 3,4-15,15'-3',4'-trisdehydro-β-carotene; partially hydrogenating the latter at the triple bond thereby producing 3,4-3',4'-bisdehydro-15,15'-mono-cis-β-carotene; and isomerizing the latter thereby producing all-trans-3,4-3',4'-bisdehydro-β-carotene.

A comprehensive embodiment of the invention comprises condensing acetylene with approximately two molar proportions of the aldehyde 8-(2,6,6-trimethyl-1,3-cyclohexadien-1-yl) - 2,6 - dimethyl-2,4,6-octatrien-1-al thereby producing the diol 1,18-di-(2,6,6-trimethyl-1,3-cyclohexadien-1-yl)-3,7,12,16 - tetramethyl - 8,11 - dihydroxy-2,4,6,12,14,16-octadecahexaen-9-yne [either in a single operation, wherein one mol of aldehyde 8-(2,6,6-trimethyl-1,3-cyclohexadien-1-yl)-2,6-dimethyl-2,4,6 - octatrien-1-al is condensed with each of the reactive hydrogen atoms in acetylene by means of a bilateral metal-organic reaction; or stepwise, wherein one mol of the aldehyde is condensed with one mol of acetylene by a metal-organic reaction thereby producing the intermediate condensation product 10-(2,6,6-trimethyl-1,3-cyclohexadien-1-yl) - 4,8-dimethyl-4,6,8-decatrien-1-yn-3-ol, which condensation product is then condensed with a second mol of the aldehyde 8 - (2,6,6-trimethyl-1,3-cyclohexadien-1-yl)-2,6-dimethyl-2,4,6-octatrien-1-al, by means of a metal-organic reaction]; subjecting the diol to dehydration, with concomitant allyl rearrangement, thereby producing 3,4-15,15'-3',4'-trisdehydro-β-carotene, reacting the latter with about one molar proportion of hydrogen in the presence of a hydrogenation catalyst selective to catalyze the hydrogenation of an acetylenic linkage only to the olefinic stage thereby producing 3,4-3',4'-bisdehydro-15,15'-mono-cis-β-carotene; and isomerizing the latter thereby producing all-trans-3,4-3',4'-bisdehydro-β-carotene.

In the first stage of a detailed procedure taught by the invention, acetylene is condensed bilaterally with 8-(2,6,6-trimethyl-1,3-cyclohexadien-1-yl) - 2,6 - dimethyl - 2,4,6-octatrien-1-al by means of a metal-organic condensation. An appropriate embodiment comprises condensing acetylene dimagnesium halide with about two molar proportions of the above named aldehyde, by means of a Grignard reaction. Acetylene dimagnesium halide can be prepared in known manner by the action of acetylene on a solution of lower alkyl magnesium halide in an inert solvent. Preferably, an ethereal solution of lower alkyl magnesium halide is stirred or shaken in an acetylene atmosphere for several hours. Suitable species of lower alkyl magnesium halide are, for example, ethyl-, butyl-, and n-hexyl-magnesium-bromides and -chlorides. In this reaction, the acetylene dimagnesium halide produced separates as a heavy oil or as a solid. It is appropriate then to add about two molar proportions of 8-(2,6,6-trimethyl - 1,3 - cyclohexadien-1-yl) - 2,6-dimethyl-2,4,6-octatrien-1-al, dissolved in an inert solvent, preferably diethyl ether, to the well stirred suspension of the acetylene dimagnesium halide, and to stir the mixture for several hours at room temperature or at the reflux temperature of the solvent. Upon hydrolysis of the condensation product, there is obtained 1,18-di-(2,6,6-trimethyl-1,3-cyclohexadien-1-yl)-3,7,12,16-tetramethyl-8,11-dihydroxy-2,4,6,12,14,16-octadecahexaen-9-yne, as a very viscid material.

An alternative mode of execution of the first stage comprises reacting approximately one molar proportion of 8 - (2,6,6-trimethyl-1,3-cyclohexadien-1-yl)-2,6-dimethyl-2,4,6-octatrien-1-al in liquid ammonia with one molar proportion of an alkali metal- or alkaline earth metal-acetylide and reacting the condensation product obtained, advantageously after hydrolysis to 10-(2,6,6-trimethyl-1,3-cyclohexadien-1-yl)-4,8-dimethyl-4,6,8-decatrien-1-yn-3-ol, by means of a metal-organic reaction with a second approximately molar proportion of 8-(2,6,6-trimethyl-1,3-cyclohexadien-1-yl) - 2,6-dimethyl-2,4,6-octatrien-1-al. The condensation in liquid ammonia can be executed either at elevated pressures and room temperature, or under normal pressures at the boiling temperature of the ammonia. Preferably, lithium acetylide is employed in the condensation. The aldehyde 8-(2,6,6-trimethyl-1,3-cyclohexadien-1-yl)-2,6-dimethyl-2,4,6-octatrien-1-al can be added in solution in an inert solvent, for example, diethyl ether. The condensation product can best be hydrolyzed by addition of an ammonium salt before removal of the ammonia, or by addition of an acid after removal of the ammonia. Condensation of the 10-(2,6,6-trimethyl-1,3-cyclohexadien-1-yl) - 4,8 - dimethyl - 4,6,8-decatrien-1-yn-3-ol with a second approximately molar proportion of 8-(2,6,6-trimethyl-1,3-cyclohexadien-1-yl)-2,6-dimethyl-2,4,6-octatrien-1-al is effected by means of a metal-organic reaction. The preferred mode of execution comprises reacting the carbinol 10-(2,6,6-trimethyl-1,3-cyclohexadien-1-yl)-4,8-dimethyl-4,6,8-decatrien-1-yn-3-ol with approximately two molar proportions of lower alkyl magnesium halide in diethyl ether. The first molar proportion of lower alkyl magnesium halide reacts with the hydroxyl group of the carbinol, whereas the second molar proportion reacts with the acetylenic hydrogen and renders the terminal carbon atom of the carbinol reactive in the condensation. The dimagnesium halide compound formed is advantageously reacted in the same solvent with 8-(2,6,6-trimethyl-1,3-cyclohexadien-1-yl) - 2,6 - dimethyl-2,4,6-octatrien-1-al. The condensation product is preferably hydrolyzed without further purification, by conventional expedients, for example by pouring into a mixture of ice and dilute sulfuric acid, thereby producing the above described 1,18-di-(2,6,6-trimethyl-1,3-cyclohexadien-1-yl)-3,7,12,16-tetramethyl - 8,11 - dihydroxy-2,4,6,12,14,16-octadecahexaen-9-yne.

In the second stage of said detailed procedure according to the present invention, the diol 1,18-di-(2,6,6-trimethyl - 1,3 - cyclohexadien-1-yl)-3,7,12,16-tetramethyl-8,11 - dihydroxy - 2,4,6,12,14,16-octadecahexaen-9-yne is subjected to bilateral dehydration, with accompanying allyl rearrangement. In this reaction each hydroxy group, if desired after esterification, migrates by a multiple allyl shift toward the nearer ring, and splits out two molar proportions of water (or acid, as the case may be) by combining with a hydrogen atom. Thereby two new double bonds are formed, and simultaneously all of the multiple bonds are arranged into a conjugated system in the product 3,4 - 15,15' - 3',4' - trisdehydro - β - carotene. The bilateral dehydration-allyl rearrangement reaction can be effected by various expedients. A general method comprises heating a solution of the above diol, in an inert solvent such as toluene, to a temperature of about 90° to about 100° C., with about two molar proportions of phosphorus oxychloride, in the presence of an organic base such as pyridine. A preferred method for the treatment of 1,18 - di - (2,6,6 - trimethyl - 1,3 - cyclohexadien-1 - yl) - 3,7,12,16 - tetramethyl - 8,11 - dihydroxy - 2,4,6-12,14,16 - octadecahexaen - 9 - yne comprises reacting the same with hydrogen halide at a low temperature, advantageously in the presence of a lower alkanol as solvent; the 1,18 - di - (2,6,6 - trimethyl - 1,3 - cyclo - hexadien - 1 - yl) - 2,17 - dihalo - 3,7,12,16 - tetramethyl-3,5,7,11,13,15 - octadecahexaen - 9 - yne first formed splits out two mols of hydrogen halide spontaneously with formation of two additional double bonds. The product of the bilateral dehydration-allyl rearrangement, the trisdehydro compound referred to above, can be purified by crystallization.

In the third stage of said detailed procedure according to the present invention, 3,4 - 15,15' - 3',4' - trisdehydro - β - carotene is partially hydrogenated catalytically at the triple bond. The partial hydrogenation can be accomplished according to methods known per se, e. g. by reaction with elemental hydrogen in the presence of a selective hydrogenation catalyst, in an organic solvent. A suitable selective hydrogenation catalyst is a palladium-on-calcium carbonate catalyst partially deactivated with lead and quinoline. An especially advantageous mode of execution of this third stage comprises effecting the hydrogenation in a hydrocarbon medium in which the 3,4 - 15,15' - 3',4' - trisdehydro - β - carotene is only partially soluble. In this manner, the trisdehydro compound subjected to hydrogenation slowly goes into solution as the hydrogenation proceeds, the hydrogenation product being precipitated from the hydrogenation mixture as it is formed. The 3,4 - 3',4' - bisdehydro - 15,15' - mono-cis-β-carotene so obtained has a characteristic "cis peak" in the ultraviolet absorption spectrum. Isolation of the hydrogenation product is not mandatory. The subsequent stage of isomerization (described immediately below) can be effected directly upon the suspension of the 3,4 - 3',4' - bisdehydro - 15, 15' - mono - cis - β - carotene. However, if desired, the hydrogenation product can be isolated and purified by crystallization.

In the last stage of said detailed procedure according to the present invention, the 3,4 - 3',4'-bisdehydro-15,15'-mono-cis-β-carotene is isomerized to the corresponding all-trans compound. This isomerization can be effected, for example, by treatment with iodine, by irradiation, or by heating. A particularly advantageous mode of execution comprises heating a suspension of 3,4 - 3',4' - bis - dehydro-15,15'-mono-cis-β-carotene for several hours at 80°–100° C., in a quantity of an organic liquid vehicle insufficient for the complete solution of the mono-cis material. As the isomerization progresses, the mon-cis compound goes into solution and simultaneously the all-trans-3,4-3',4'-bisdehydro-β-carotene formed crystallizes out, so that an almost quantitative isomerization can be attained. The product so synthesized according to the invention can be purified by crystallization, by partition between solvents, or by chromatography. It can be stabilized, when necessary, by the addition of antioxidants, which latter can also be employed during the execution of the processes of the invention.

As will be seen from the foregoing, in an important aspect the invention provides a process for the preparation of all-trans-3,4-3',4'-bisdehydro-β-carotene which comprises partially hydrogenating 3,4-15,15'-3',4'-trisdehydro-β-carotene at the triple bond thereby forming 3,4-3',4'-bisdehydro-15,15'-mono-cis-β-carotene and isomerizing the latter thereby forming all-trans-3,4-3',4'-bisdehydro-β-carotene.

The product all-trans-3,4-3',4'-bisdehydro-β-carotene synthesized according to the invention is useful as a coloring agent for foodstuffs, e. g. butter, cheese and margarine, and for feedstuffs. Inasmuch as synthetic all-trans-3,4-3',4'-bisdehydro-β-carotene produced according to the invention also possesses the biological activity characteristic of vitamin A, it imparts this activity, as well as its characteristic orange-red color, to the nutrient materials in which it is incorporated.

The invention is further disclosed in the following examples which are illustrative but not limitative thereof.

*Example 1*

30 g. of 4-(2,6,6-trimethyl-1-cyclohexen-1-yl)-2-methyl-2-buten-1-al in 210 g. of methylene chloride, together with 13.5 g. of sodium bicarbonate and 9 g. of calcium oxide, was cooled to 0° C., while stirring. Then 28 g. of N-bromosuccinimide was added, and the temperature was maintained for 3 hours at 5° to 10° C. by intermittent cooling. After some time the mixture assumed a yellow to red color, then slowly became colorless again. It was filtered, 30 g. of quinoline was added, and the methylene chloride was removed in vacuo. Again 30 g. of quinoline was added, and the mixture was warmed for 2 hours under nitrogen on a steam bath. 350 g. of petroleum ether (B. P. 30° to 60° C.) was added, and then the mixture was poured into 250 g. of 3N sulfuric acid and ice, while stirring. The insoluble resin was filtered off and the aqueous layer was also removed; the residual petroleum-ether solution was washed with water, dilute sodium bicarbonate solution and then with water again. The washed petroleum ether solution was dried over sodium sulfate and concentrated, yielding 29.4 g. of crude 4-(2,6-6 - trimethyl-2-cyclohexen-1-ylidene)-2-methyl-2-buten-1-al; this product was purified by distillation from a Hickman flask in a high vacuum; B. P. 90° C./0.03 mm. Hg.

*Example 2*

136 g. of 4-(2,6,6-trimethyl-2-cyclohexen-1-ylidene)-2-methyl-2-buten-1-al was heated with 97 ml. of isopropenyl acetate and 0.7 g. of p-toluenesulfonic acid for 3 to 4 hours at 100° to 140° C., while passing through a slow stream of nitrogen, the acetone released being thus continuously distilled out of the reaction mixture. Then the reaction mixture was allowed to cool. The reaction mixture, containing crude 4-(2,6,6-trimethyl-1,3-cyclohexadien-1-yl)-2-methyl-1-acetoxy-1,3-butadiene, was directly subjected to hydrolysis, by adding thereto 650 ml. of methanol, 65 ml. of water and 46 g. of sodium bicarbonate, and refluxing the mixture for 12 hours while stirring. The reaction mixture was then poured into 2000 ml. of ice water, and the resulting mixture was made slightly acidic with dilute sulfuric acid. The reaction product was extracted with petroleum ether, the extract was washed with aqueous sodium bicarbonate solution and dried over sodium sulfate. The solvent was evaporated and the residue was distilled in a high vacuum. There was obtained 98 g. of 4-(2,6,6-trimethyl-1,3-cyclohexadien-1-yl)-2-methyl-2-buten-1-al; B. P.=80° C./0.05 mm. Hg; $n_D^{22}$=1.530; u. v. maxima at 224 mµ and 268 mµ;

$E_1^1$=795 and 345

(in petroleum ether solution).

Example 3

A solution of 82 g. of 4-(2,6,6-trimethyl-1,3-cyclohexadien-1-yl)-2-methyl-2-buten-1-al in 90 ml. of ethyl orthoformate was mixed with a solution of 1.5 ml. of orthophosphoric acid in 15 ml. of absolute ethanol, and the mixture was allowed to stand for 15 hours at 20° to 25° C. Then 10 ml. of pyridine was added and the mixture was poured into a mixture of 100 g. of 5% aqueous sodium bicarbonate solution and 60 g. of ice. The reaction product was extracted with petroleum ether, the extract was shaken with aqueous sodium bicarbonate solution and dried over potassium carbonate. The solution was concentrated, and the residue was freed in vacuo at 70° C. from excess ethyl orthoformate and ethyl formate produced by reaction. The residue, 108 g. of crude 4 - (2,6,6 - trimethyl - 1,3 - cyclohexadien - 1 - yl) - 2-methyl-1,1-diethoxy-2-butene, had $n_D^{25} = 1.487$; absorption maximum in the ultraviolet spectrum at 266 m$\mu$ (in petroleum ether solution). It was used without further purification for the next step.

To the above 108 g. of material was added 3 ml. of a 10% by weight solution of zinc chloride in ethyl acetate; then 29 g. of ethyl vinyl ether and 27 ml. of the same 10% solution of zinc chloride in ethyl acetate were added simultaneously, with stirring, at 30° to 35° C., over a period of about 2 hours; stirring was continued 20 hours longer at room temperature. The crude 6-(2,6,6-trimethyl - 1,3 - cyclohexadien - 1 - yl) - 4 - methyl - 1,1,3 - triethoxy-4-hexene obtained in this manner was added to a mixture of 300 ml. of glacial acetic acid, 15 g. of sodium acetate and 10 ml. of water, and the reaction mixture was heated at 95° C. for 6 hours in a nitrogen atmosphere. The reaction mixture was cooled to 30°–40° C., poured into a mixture of 200 g. of ice and 200 ml. of water. The resulting mixture was extracted with petroleum ether, the extract was washed with 5% aqueous sodium bicarbonate solution and then with water, and dried over sodium sulfate. The petroleum ether solution was concentrated and the residue was distilled in a high vacuum. There was thus obtained 65 g. of 6-(2,6,6-trimethyl-1,3-cyclohexadien-1-yl)-4-methyl-2,4-hexadien-1-al, B. P. = about 105° C./0.05 mm. Hg. This material was recrystallized twice from petroleum ether at minus 70° C., yielding yellowish crystals of M. P. 18° to 22° C.; ultraviolet absorption maximum at 274 m$\mu$, $$E_1 = 1380$$

(in petroleum ether solution).

Example 4

A solution of 38.5 g. of 6-(2,6,6-trimethyl-1,3-cyclohexadien-1-yl)-4-methyl-2,4-hexadien-1-al in 40 ml. of ethyl orthoformate was mixed with a solution of 0.6 ml. of orthophosphoric acid in 9 ml. of absolute ethanol, and the reaction mixture was allowed to stand for 15 hours at 20° to 25° C. Then 6 ml. of pyridine was added, and the mixture was poured into a mixture of 50 g. of 5% aqueous sodium bicarbonate solution and 30 g. of ice. The product was extracted from the resulting mixture with petroleum ether, the petroleum ether extract was shaken with aqueous sodium bicarbonate solution and dried over potassium carbonate. The petroleum ether solution was concentrated, and the residue was liberated in vacuo at 70° C. from excess ethyl orthoformate and ethyl formate produced by reaction, yielding 49 g. of 6-(2,6,6-trimethyl-1,3 - cyclohexadien - 1 - yl) - 4 - methyl - 1,1 - diethoxy-2,4-hexadiene, $n_D^{26} = 1.510$, u. v. absorption maxima at 235 m$\mu$ and 264 m$\mu$ (in petroleum ether solution). This material was used for subsequent processing without further purification.

The above 49 g. of material was mixed with 2 ml. of a 10% by weight solution of zinc chloride in ethyl acetate. Then, 14 g. of ethyl propenyl ether and 14 ml. of the same 10% solution of zinc chloride in ethyl acetate were added simultaneously, with stirring, at 20° to 35° C., over a period of 2 hours. The reaction mixture was stirred further for 15 hours at room temperature. Then the reaction mixture was extracted with petroleum ether, the extract was washed with dilute aqueous NaOH solution and dried over potassium carbonate. The solvent was distilled off, yielding 55 g. of crude 8-(2,6,6-trimethyl-1,3-cyclohexadien - 1 - yl) - 2,6 - dimethyl-1,1,3-triethoxy-4,6-octadiene, $n_D^{22} = 1.501$, u. v. absorption maxima at 236 m$\mu$ and 262 m$\mu$ (in petroleum ether solution). This material was processed without further purification.

The above 55 g. of material was mixed with 120 ml. of glacial acetic acid, 10 g. of sodium acetate and 6 ml. of water. A trace of hydroquinone was added, and the reaction mixture was heated at 95° C. for 6 hours. The mixture was then cooled to 30° to 40° C. and poured into a mixture of 100 g. of ice and 100 ml. of water. The reaction product was extracted with petroleum ether, the petroleum ether extract was washed with aqueous sodium bicarbonate solution and then with water, and dried over sodium sulfate. The petroleum ether solution was concentrated, and the residue was distilled in a high vacuum, yielding 30 g. of 8-(2,6,6-trimethyl-1,3-cyclohexadien-1-yl)-2,6-dimethyl-2,4,6-octatrien-1-al, B. P. = 138° to 143° C./0.08 mm. Hg; which soon solidified into a crystalline mass. The materal was recrystallized twice from twice its weight of petroleum ether at minus 70° C., yielding yellow crystals of M. P. 64° to 66° C., u. v. absorption maximum at 315 m$\mu$, $$E_1^1 = 1745$$

(in petroleum ether solution).

Example 5

16 g. of magnesium and 110 g. of n-hexyl bromide were reacted in 330 ml. of absolute diethyl ether, thereby forming an ethereal solution of n-hexyl magnesium bromide. This Grignard solution was stirred for 24 hours in an atmosphere of acetylene. Two layers were formed. The upper layer was separated off. The lower layer was washed once with 100 ml. of absolute diethyl ether, and to the washed material was added 200 ml. of absolute diethyl ether, and then a solution of 80 g. of 8-(2,6,6-trimethyl-1,3-cyclohexadien-1-yl)-2,6-dimethyl-2,4,6-octatrien-1-al in 200 ml. of absolute diethyl ether was added quickly. The mixture was refluxed for 3 hours, while stirring, in a nitrogen atmosphere. Then the reaction mixture was cooled, poured into a mixture of 75 g. of ammonium chloride and 175 g. of ice-water, and the whole was stirred well for 10 minutes. The ether layer was separated; washed thrice, each time with 200 ml. of water; and the washed ethereal solution was dried over sodium sulfate. The ether was driven off, yielding 87 g. of yellow, resinous, 1,18-di-(2,6,6-trimethyl-1,3-cyclohexadien-1-yl)-3,7,12,16 - tetramethyl - 8,11 - dihydroxy-2,4,6,12,14,16-octadecahexaen-9-yne, having an absorption maximum in the ultraviolet spectrum at 285 m$\mu$ (in petroleum ether).

Example 6

Dry, acetone-free acetylene was introduced into a solution of 3 g. of lithium in 1200 ml. of liquid ammonia, unitl there was no further reaction. Then, while stirring vigorously, a solution of 100 g. of 8-(2,6,6-trimethyl-1,3-cyclohexadien-1-yl)-2,6-dimethyl - 2,4,6-octatrien-1-al in 400 ml. of absolute diethyl ether was added over a period of 20 minutes, and the reaction mixture was stirred thoroughly for 20 hours, with precautions to exclude moisture. Thereupon 50 g. of ammonium chloride was added in small portions, and the ammonia was permitted to evaporate. 400 ml. of water was added, the ether layer was separated and washed with water, then dried over sodium sulfate and concentrated. The residual reddish oil was dried well in vacuo. There was obtained 108 g. of 10-(2,6,6-trimethyl-1,3-cyclohexadien-1-yl)-4,8-dimethyl-4,6,8-decatrien-1-yn-3-ol as a viscous oil, having an absorption maximum in the ultraviolet spectrum at 284 mμ (in petroleum ether). Determination of active hydrogen according to Zerewitinoff showed, in the cold, one active hydrogen atom; and in the warm, two active hydrogen atoms.

The latter material (108 g.) was dissolved in 500 ml. of absolute diethyl ether, and was added gradually, at 15°–20° C., while stirring, to a Grignard solution prepared from 18 g. of magnesium, 91 g. of ethyl bromide and 300 ml. of absolute diethyl ether. The reaction mixture was refluxed for one hour in a nitrogen atmosphere, then cooled with ice water. A solution of 92 g. of 8-(2,6,6-trimethyl-1,3-cyclohexadien-1-yl)-2,6-dimethyl-2,4,6-octatrien-1-al in 400 ml. of absolute diethyl ether was added, at about 20° C., and the reaction mixture was refluxed for 3 to 4 hours in a nitrogen atmosphere. The reaction mixture was then poured into a mixture of 400 ml. of 3 N sulfuric acid and 600 g. of ice, the ether layer was separated and washed with 5% aqueous sodium bicarbonate solution, dried over sodium sulfate, and concentrated in vacuo, yielding 200 g. of resinous 1,18-di-(2,6,6-trimethyl-1,3-cyclohexadien-1-yl)-3,7,12,16-tetramethyl - 8,11-dihydroxy-2,4,6,12,14,16-octadecahexaen-9-yne.

Example 7

A solution of 19 g. of 1,18-di-(2,6,6-trimethyl-1,3-cyclohexadien-1-yl) - 3,7,12,16 - tetramethyl - 8,11-dihydroxy-2,4,6,12,14,16-octadecahexaen-9-yne in 38 ml. of toluene was added gradually to a well stirred mixture of 6.8 ml. of phosphorus oxychloride, 34 ml. of pyridine and 30 ml. of toluene, while cooling with ice-water. Then the reaction mixture was heated for one hour at 95° C., quickly cooled down, and poured upon 300 g. of ice. The toluene solution was separated; washed twice, each time with 200 ml. of 3 N sulfuric acid; and then twice, each time with 200 ml. of 5% aqueous sodium bicarbonate solution. The washed toluene solution was dried over sodium sulfate, and the solvent was removed under a water pump vacuum. The crystalline residue was washed with a little petroleum ether and was recrystallized from a mixture of methylene chloride and methanol. The red-violet crystals of 3,4-15,15'-3',4'-trisdehydro-β-carotene so obtained had M. P. 165°–167° C.; u. v. maximum at 449 mμ (in petroleum ether solution).

Example 8

0.75 g. of 3,4-15,15'-3',4'-trisdehydro-β-carotene in 20 ml. of toluene was shaken in a hydrogen atmosphere at 20° C. in the presence of 0.2 g. of palladium-lead-calcium carbonate catalyst [Lindlar, Helvetica Chimica Acta 35, 450 (1952)] and 0.05 ml. of quinoline until one molar proportion of hydrogen was taken up. The catalyst was then filtered off, and the solvent was removed in a high vacuum. The residue was crystallized from a mixture of methylene chloride and methanol, thereby yielding 15,15'-mono-cis-3,4-3',4'-bisdehydro-β-carotene as dark red to violet crystals; M. P. 190° C. (after softening and resolidification at 130°–140° C.); u. v. absorption maxima at 366 mμ ("cis peak") and 467 mμ (in petroleum ether solution).

Example 9

A suspension of 5 g. of 15,15'-mono-cis-3,4-3',4'-bisdehydro-β-carotene in 30 ml. of petroleum ether (B. P. 80°–100° C.) was refluxed for 22 hours in a nitrogen atmosphere. Then the mixture was cooled and the crystalline precipitate was filtered off. The solid was recrystallized from a mixture of methylene chloride and petroleum ether (alternatively, from ethylene chloride/methanol). The blue-violet crystals of all-trans-3,4-3',4'-bisdehydro-β-carotene so obtained had M. P. 190°–191° C., and showed an absorption maximum in the ultraviolet spectrum at 471 mμ (in petroleum ether solution).

Example 10

1 g. of 1,18-di-(2,6,6-trimethyl-1,3-cyclohexadien-1-yl)-3,7,12,16-tetramethyl-8,11 - dihydroxy-2,4,6,12,14,16-octadecahexaen-9-yne was dissolved in 20 ml. of diethyl ether, and the solution was mixed with 2 ml. of ethanolic hydrogen chloride containing 23.7% by weight HCl and 4 ml. of ethanol. The mixture was allowed to stand for 2 hours at room temperature and then for an additional period of 18 hours at 0°–5° C. The crystals formed were filtered off with suction, washed with methanol and with petroleum ether, and then dried. There was obtained 0.8 g. of 3,4-15,15'-3',4'-trisdehydro-β-carotene, M. P. 165° C.

We claim:

1. A process which comprises condensing acetylene with 8-(2,6,6-trimethyl - 1,3 - cyclohexadien-1-yl)-2,6-dimethyl-2,4,6-octatrien - 1 - al thereby forming 1,18-di-(2,6,6-trimethyl-1,3-cyclohexadien-1-yl)-3,7,12,16 - tetramethyl-8,11-dihydroxy - 2,4,6,12,14,16 - octadecahexaen-9-yne, subjecting the latter to bilateral dehydration-allyl rearrangement thereby forming 3,4-15,15'-3',4'-trisdehydro-β-carotene, partially hydrogenating the latter at the triple bond thereby forming 3,4-3',4'-bisdehydro-15,15'-mono-cis-β-carotene, and isomerizing the latter thereby forming all-trans-3,4-3',4'-bisdehydro-β-carotene.

2. 1,18-di-(2,6,6-trimethyl - 1,3 - cyclohexadien-1-yl)-3,7,12,16 - tetramethyl - 8,11 - dihydroxy-2,4,6,12,14,16-octadecahexaen-9-yne.

3. A process of making 3,4-15,15'-3',4'-trisdehydro-β-carotene which comprises subjecting 1,18-di-(2,6,6-trimethyl-1,3-cyclohexadien-1-yl) - 3,7,12,16 - tetramethyl-8,11-dihydroxy - 2,4,6,12,14,16 - octadecahexaen-9-yne to bilateral dehydration-allyl rearrangement.

References Cited in the file of this patent

UNITED STATES PATENTS 2,671,112   Inhoffen et al. _____ Mar. 2, 1954

UNITED STATES PATENT OFFICE
Certificate of Correction

Patent No. 2,806,885

Otto Isler et al.

September 17, 1957

It is hereby certified that error appears in the printed specification of the above numbered patent requiring correction and that the said Letters Patent should read as corrected below.

Column 3, line 6, for "hydroxy" read —hydroxyl—; column 5, line 47, for $E_1$ read —$E_1^1$—
column 6, line 26, for "materal" read —material—; column 8, line 13, for "ethylene chloride" read —methylene chloride—.

Signed and sealed this 12th day of November 1957.

[SEAL]

Attest:
KARL H. AXLINE,
*Attesting Officer.*

ROBERT C. WATSON,
*Commissioner of Patents.*